US008485017B1

(12) United States Patent
Trompeter

(10) Patent No.: US 8,485,017 B1
(45) Date of Patent: Jul. 16, 2013

(54) ROBOTIC WORK OBJECT CELL CALIBRATION SYSTEM

(76) Inventor: Matthew E. Trompeter, Macomb, MI (US)

( * ) Notice: Subject to any disclaimer, the term of this patent is extended or adjusted under 35 U.S.C. 154(b) by 0 days.

(21) Appl. No.: 13/563,903

(22) Filed: Aug. 1, 2012

(51) Int. Cl.
G01B 11/00 (2006.01)

(52) U.S. Cl.
USPC .......................................................... 73/1.79

(58) Field of Classification Search
None
See application file for complete search history.

(56) References Cited

U.S. PATENT DOCUMENTS

| 6,044,308 | A | 3/2000 | Huissoon | |
|---|---|---|---|---|
| 6,321,137 | B1 | 11/2001 | de Smet | |
| 6,408,252 | B1 | 6/2002 | de Smet | |
| 7,359,817 | B2 * | 4/2008 | Ban et al. | 702/94 |
| 2009/0157226 | A1 * | 6/2009 | de Smet | 700/254 |
| 2012/0265341 | A1 * | 10/2012 | Trompeter | 700/254 |
| 2012/0283874 | A1 * | 11/2012 | Trompeter | 700/254 |

* cited by examiner

Primary Examiner — Robert R Raevis
(74) Attorney, Agent, or Firm — Gerald R. Black, Esq.

(57) ABSTRACT

The robotic work object cell calibration system includes a work object. The work object emits a pair of beam-projecting lasers acting as a crosshair, intersecting at a tool contact point (TCP). The work object emits four plane-projecting lasers are used to adjust the yaw, pitch, and roll of the robot tool relative to the tool contact point (TCP). The robotic work object cell calibration system provides a calibration system which is simpler, which involves a lower investment cost, which entails lower operating costs than the prior art, and can be used for different robot tools on a shop floor without having to perform a recalibration for each robot tool.

15 Claims, 13 Drawing Sheets

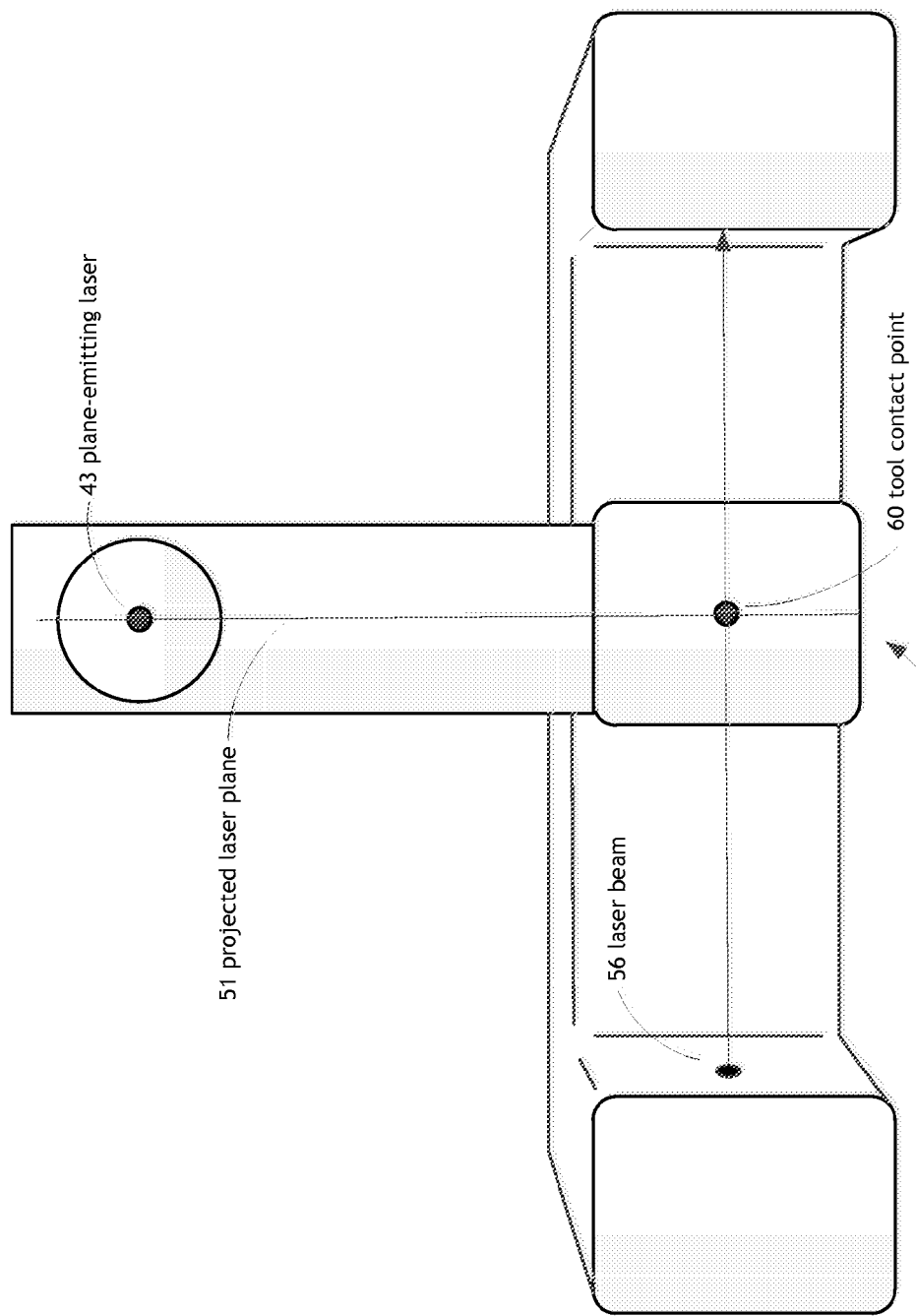

ROBOT without WORK OBJECT
(PRIOR ART)

ROBOT with WORK OBJECT

ROBOT with WORK OBJECT

ROBOTIC WORK OBJECT CELL CALIBRATION SYSTEM

This application is related to and claims priority to U.S. Provisional Application No. 61/465,080, entitled "Robotic Work Object Cell Calibration System and Method," filed on Mar. 14, 2011, to U.S. Provisional Application No. 61/518,912, entitled "Robotic Work Object Cell Calibration System and Method," filed on May 13, 2011, U.S. patent application Ser. No. 13/385,091, entitled "Robotic Work Object Cell Calibration System," filed on Feb. 1, 2012, U.S. patent application Ser. No. 13/385,797, entitled "Robotic Work Object Cell Calibration Method," filed on Mar. 7, 2012, and PCT Application No. PCT/US2012/00140, entitled "Robotic Work Object Cell Calibration Device, System, and Method," filed on Mar. 14, 2012, and U.S. patent application Ser. No. 13/385,091 "Robotic Work Object Cell Calibration System," filed on Feb. 1, 2012.

FIELD OF USE

The present invention relates to a calibration device and system for an industrial robot and, more particularly, to a calibration system for the industrial robot provided with an imaging device of a visual sensor for detecting a working tool and a working position.

BACKGROUND OF THE INVENTION

The sales of industrial robots that has been driven by the automotive industry, is now moving into tasks as diverse as cleaning sewers, detecting bombs, and performing intricate surgery. The number of units sold increased to 120,000 units in 2010, twice the number as the previous year, with automotive, metal and electronics industries driving the growth.

Prior approaches to calibrating robots use measuring devices that measure either the inaccuracies of the robot after the robot is built or devices which measure work piece positions relative to the robot position prior to off-line programs. Prior art systems involve expensive equipment and specialized users and take longer.

U.S. Patent Application Disclosure No. 20090157226 (de Smet) discloses a robot-cell calibration system for a robot and it's peripheral. The system includes an emitter attached to the robot or its' peripheral and emits a laser beam and a receiver also mounted to the robot or its peripheral at a point to permit calibration and for receiving the laser beam and to permit calculations to determine the dimension between the emitter and the receiver.

U.S. Pat. No. 6,408,252 (de Smet) discloses a calibration system and displacement measurement device for calibrating a robot system. The system comprising a linear displacement measurement device in conjunction with a robot calibration system. The linear displacement measurement device comprising an elongated member, a drum, a shaft, a drum displacement mechanism and a drum rotation sensor. The drum is displaced axially upon the shaft as the drum rotates when the elongated member is moved. The drum rotation sensor provides accurate information regarding the distance the elongated member travels. The displacement measuring device is used in an iterative manner with the calibration system for the purpose of the calibration of a robotic device.

U.S. Pat. No. 6,321,137 (de Smet) discloses a method for calibration of a robot inspection system. The system is used for inspecting a work piece to maintain the accuracy of the robot during inspection of work pieces on a production basis. The system includes means for storing a mathematical model of the robot, means for measuring the position of a target, and then calibrating the robot based upon input from the mathematical model and the position of the target.

U.S. Pat. No. 6,044,308 (Huissoon) discloses a method for calibration of pose of a tool contact point (TCP) of a robot controlled tool with respect to a tool sensor means in which the robot controlled tool is attached at an end-point of the robot. A TCP sensor is located in a preselected second pose with respect to the reference fixture for sensing position of the tool contact point. The method includes positioning the tool sensor so that the reference fixture is in a field of view of the tool sensor and calculating a pose of the robot end point with respect to the robot frame of reference, calculating a pose of the reference fixture with respect to the tool sensor means from a sensed position of the four topographically defined features of the reference fixture, and calculating a position of the tool contact point with respect to the reference fixture from a sensed position of the tool contact point with respect to the TCP sensor means.

The primary object of the robotic work object and cell calibration system of the present invention is to increase the accuracy of the off-line program and decrease robot teaching time.

Yet another object of the robotic work object and cell calibration system of the present invention is to introduce an improved calibration device for use with robotic systems.

Still another object of the robotic work object and cell calibration system of the present invention is to provide a calibration system that is simpler, which results in improved precision, which involves a lower investment cost, and which entails lower operating costs than the prior art.

What is needed is a robotic work object cell calibration system for using different robot tools on a shop floor without having to perform a recalibration for each tool. What is needed is a robotic work object cell calibration system that requires no additional computers or software to determine the accuracy of the robot tool or location of peripheral equipment, which uses existing body-in-white procedures, personnel computers and software and ways of communicating information amongst the trades, and requires little or no retraining to deploy.

SUMMARY OF THE INVENTION

The robotic work object and cell calibration system of the present invention addresses these objectives and these needs.

In the first preferred embodiment of the present invention, the robotic work object cell calibration system includes a work object. The work object emits a pair of beam-projecting lasers from an E-shaped extension extending from a central frame. The beam-projecting lasers serve as a crosshair, intersecting at a tool contact point (TCP). The work object includes a horizontal frame member that includes a pair of opposing frame ends, and a vertical frame member that includes a pair of opposing frame ends. A plane-projecting laser is preferably disposed at each frame end, respectively, and a projected laser plane is emitted from each of the plane-projecting lasers, respectively. The plane-projecting lasers are used to adjust the yaw, pitch, and roll of the robot tool relative to the tool contact point (TCP).

A second preferred embodiment of the work object of the present invention comprises only two plane-projecting lasers being attached to the frame ends.

A third preferred embodiment of the work object of the present invention comprises of only one plane-projecting laser attached to the middle of the work object in whereby the laser head is capable of 360 degrees of rotation, allowing the robot tool to align first on x-axis, then on the z-axis after the laser head has been rotated.

For a complete understanding of the robotic work object and cell calibration system of the present invention, reference is made to the following summary of the invention detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

BRIEF DESCRIPTION OF THE DRAWINGS

FIG. 10 depicts a fourth preferred embodiment of the work object of the present invention, two plane-projecting lasers being emitted along the vertical axis of the work object, and a beam-projecting laser intersecting one of the vertical plane-projecting lasers at a tool contact point.

DETAILED DECRYPTION OF THE PREFERRED EMBODIMENTS

Figure 1:
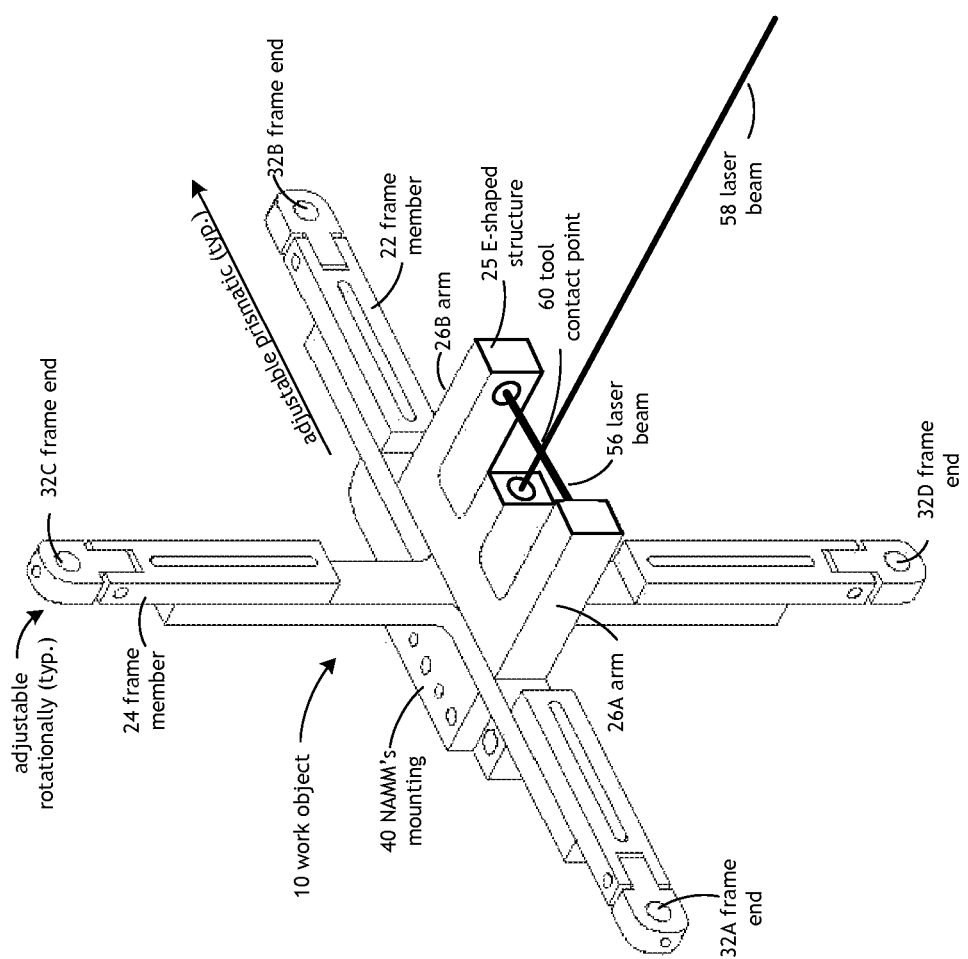
FIG. 1 depicts the first preferred embodiment of the work object of the present invention, and the two beam-projecting lasers are used for aligning the tool contact point with the work object.
Figure 2:
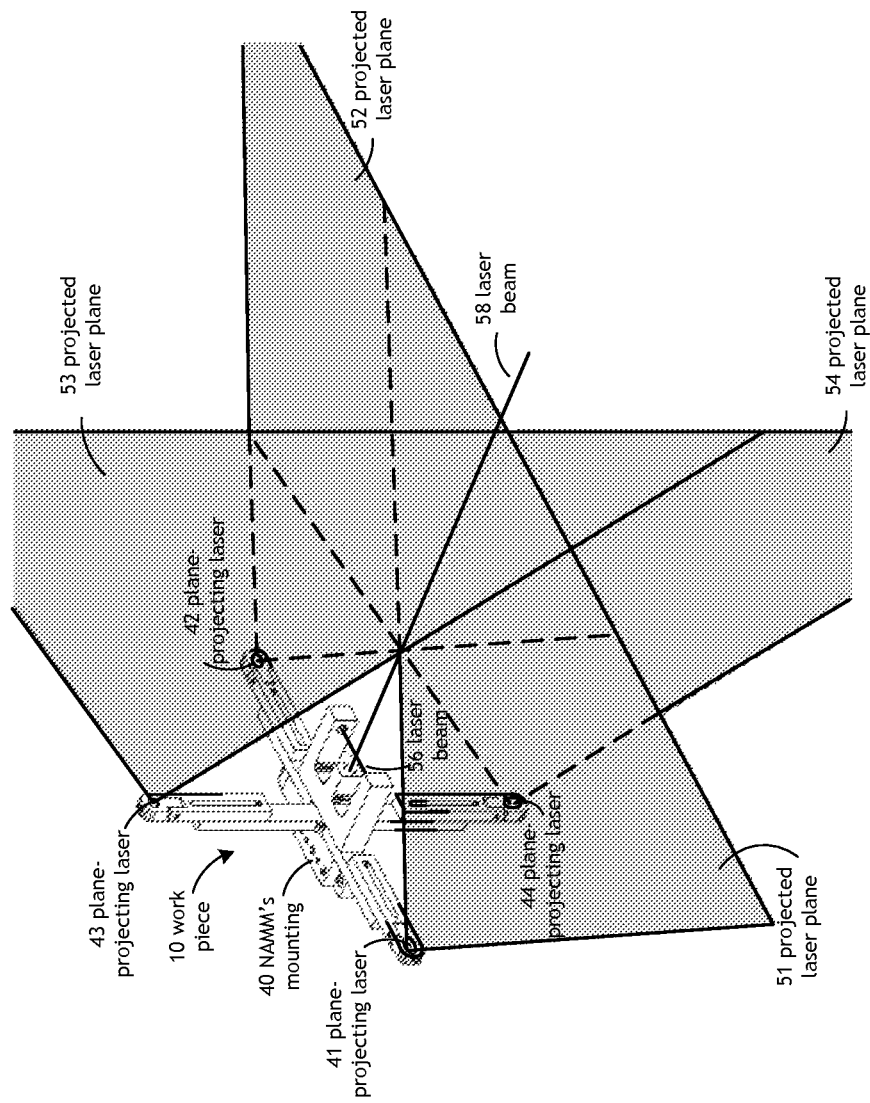
FIG. 2 depicts the first preferred embodiment of the work object of FIG. 1, the four plane-projecting lasers emitted from the work object.

Referring now to the drawings, FIGS. 1 and 2 disclose a first preferred embodiment of the work object [10] of the present invention. The work object [10] is used to calibrate the work path of a robot tool based on a tool contact point (point in space) [60]. The known point in space [60] is defined in three dimensions (X, Y, and Z) and relative to their rotational axes $R_x$ (pitch), $R_y$ (yaw), and $R_z$ (roll).

The work object [10] includes a horizontal frame member [22] that includes a pair of opposing frame ends [32A and 32B], and a vertical frame member [24] that includes a pair of opposing frame ends [32C and 32D]. A plane-projecting laser [41, 42, 43, and 44] is preferably disposed at each frame end [32A, 32B, 32C, and 32D], respectively, and a projected laser plane [51, 52, 53, and 54] is emitted from each of the plane-projecting lasers [41, 42, 43, and 44], respectively.

Extending along the horizontal frame member [22] are three arms parallel which combine to form the general shape of the letter "E" of an E-shaped structure [25] which is horizontally aligned and generally centrally disposed relative to frame member [22]. The center arm (not numbered) is shorter than the two end arms [26A and 26B].

A first beam-projecting laser [58] is emitted from the center arm of the "E" disposed at the proximate center of the work object [10]. A second beam-projecting laser [56] is emitted from one of the arms [26A] of an E-shaped structure [25] and is directed into the opposing arm [26B].

The first beam-projecting laser [58] intersects and is preferably perpendicular and coplanar with the second beam-projecting laser [56] at a known point in space [60], defined in three dimensions in terms of X, Y, and Z coordinates.

The first beam-projecting laser [58] is essentially coplanar with the two projected laser planes [51 and 52] emitted from the plane-projecting lasers [41 and 42] emitted from frame ends [32A and 32B]. Also, the first beam-projecting laser [58] is essentially coplanar with the two projected laser planes [53 and 54] emitted from the plane-projecting lasers [43 and 44] emitted from frame ends [32C and 32D]. The work object [10] is mountable onto a fixture [90] and enables a robot work path to be calibrated relative to the known point in space [60].

The plane-projecting lasers [41, 42, 43, and 44] are focusable lines that project the four projected laser planes [51, 52, 53, and 54] from the frame ends [32A, 32B, 32C, and 32D] of the work object [10]. As seen in FIG. 1, the frame is adjustable inwardly and outwardly. The plane-projecting lasers [41, 42, 43, and 44] are red laser modules, having focused lines (3.5 v~4.5 v 16 mm 5 mw).

The beam projecting lasers [56 and 58] are focusable points that project the two laser beams emitted from the arm [26A] of the work object [10]. The beam projecting lasers [56 and 58] are red laser modules, having focusable dots (3.5 v~4.5 v 16 mm 5 mw).

Figure 3:
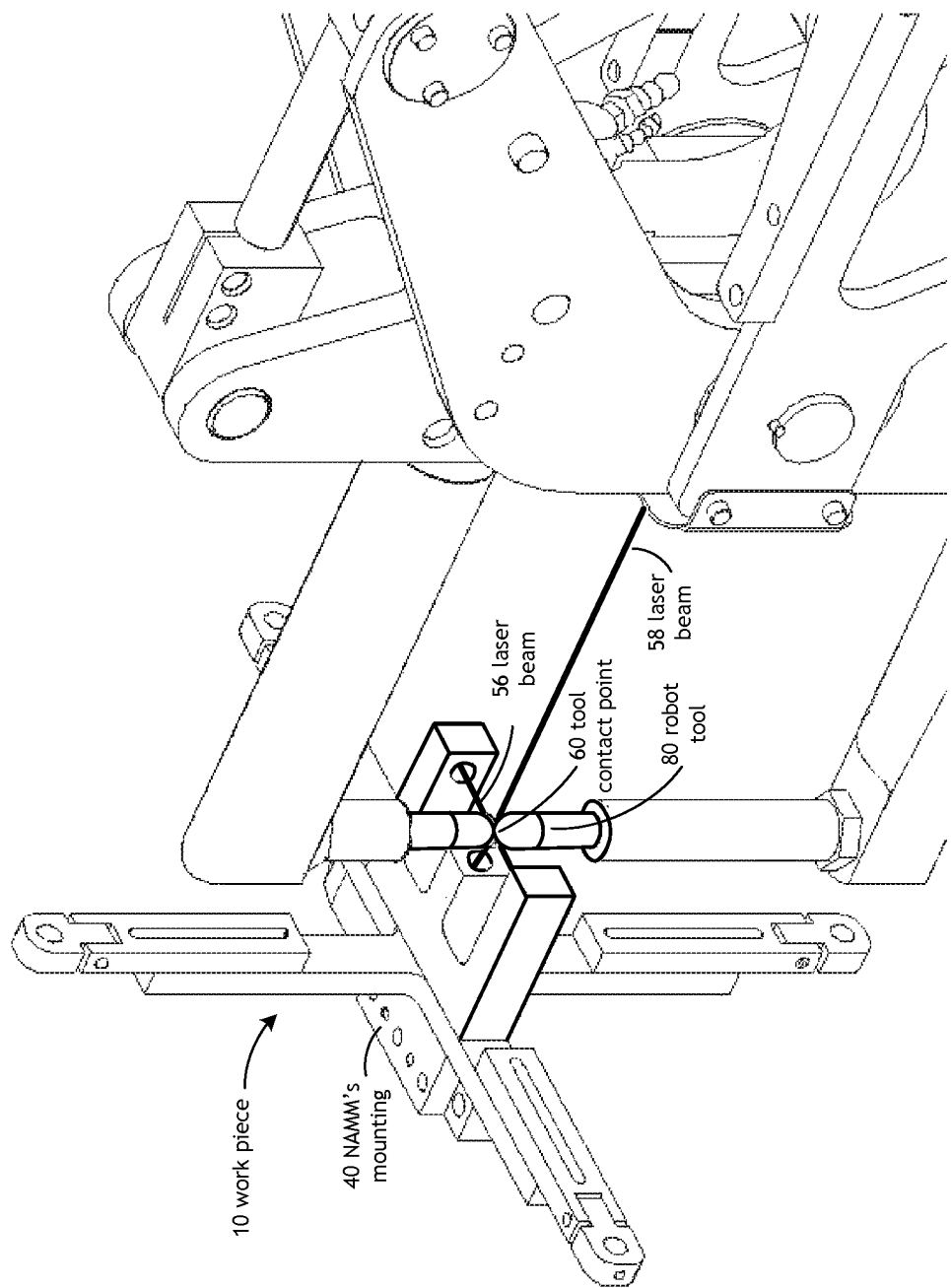
FIG. 3 depicts an exploded view of the first preferred embodiment of the work object of FIG. 1, further depicting the weld gun with the tool contact point of the weld gun aligned to the horizontal and vertical alignment lasers.

FIG. 3 discloses an exploded view of the work object [10] depicting a weld gun with the tool contact point [60] of the weld gun aligned to the two beam-projecting alignment lasers [56 and 58].

Figure 4:
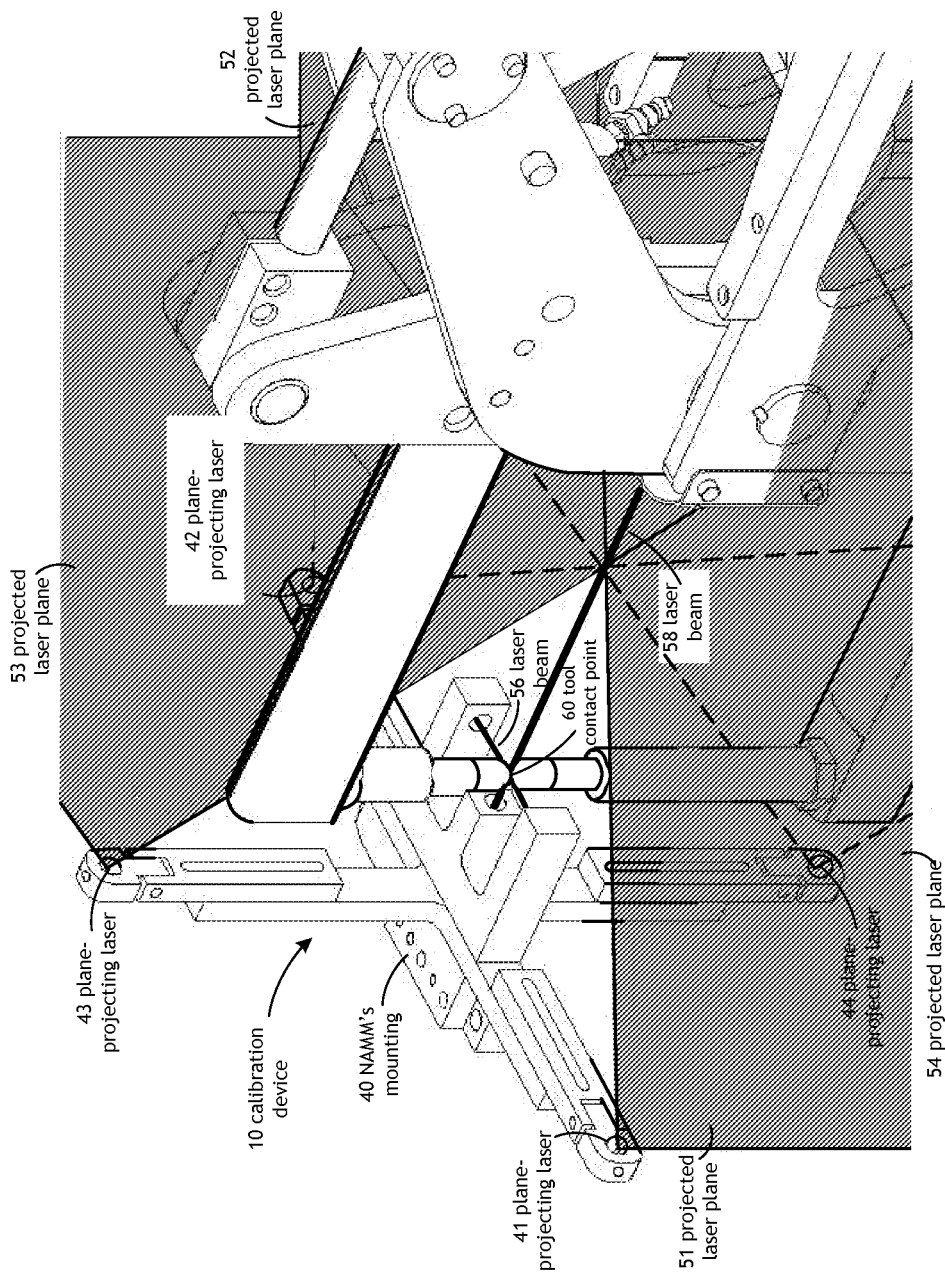
FIG. 4 depicts the exploded view of the first preferred embodiment of the work object of FIG. 3, further depicting the addition of two pairs of plane-projecting lasers for adjusting the yaw, pitch, and roll of the tool head of the weld gun.

FIG. 4 further depicts the addition of the four projected laser planes [51, 52, 53, and 54] from the plane-projecting lasers [41, 42, 43, and 44] for adjusting the yaw, pitch, and roll of the tool head of the robot.

Figure 5:
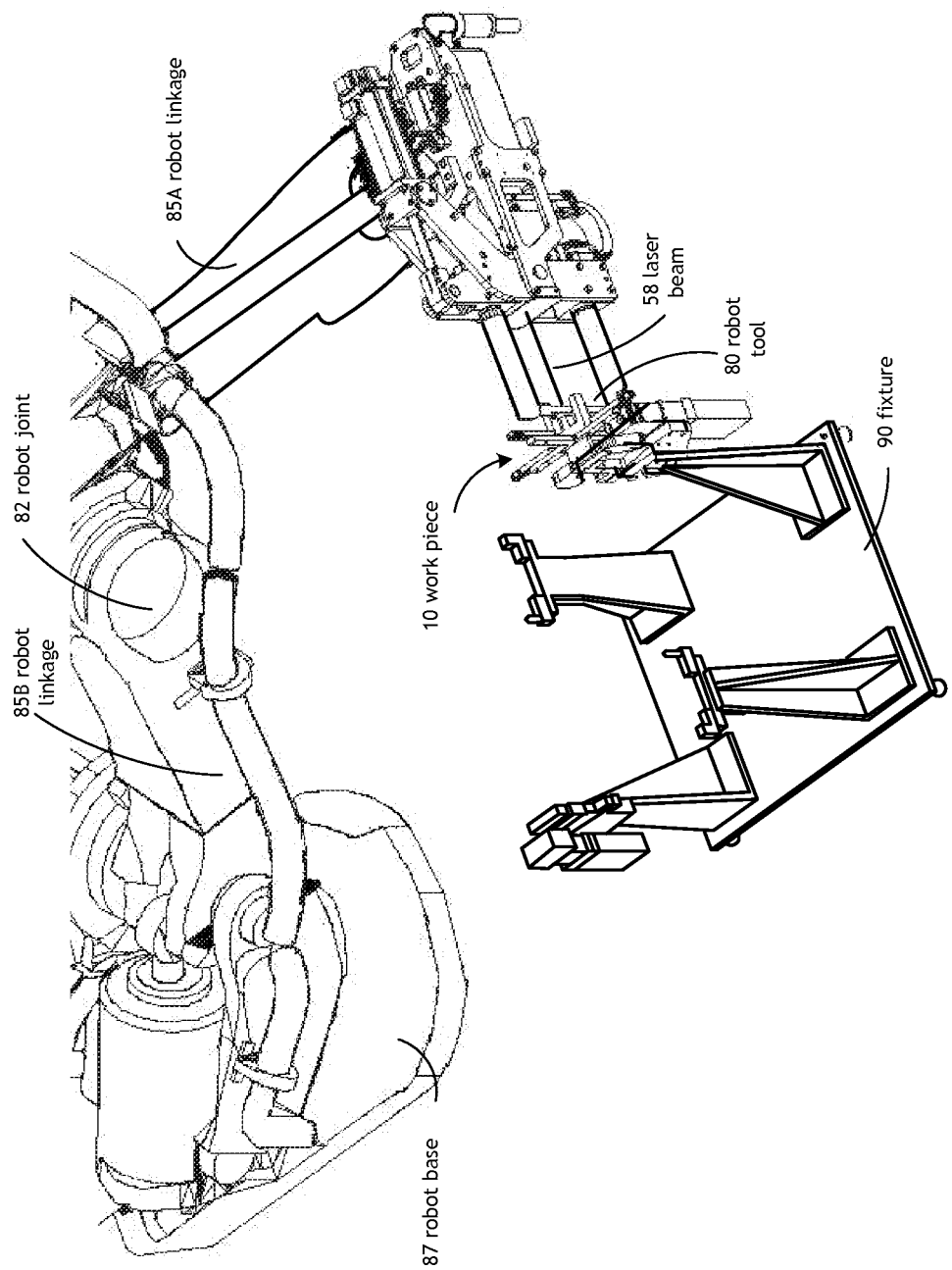
FIG. 5 depicts an assembly view of the first preferred embodiment of the work object of FIG. 1, further depicting the work object being mounted onto a fixture with the robot tool head aligned to the two beam-projecting lasers using the tool contact point.

FIG. 5 further depicts the work object [10] being mounted onto the fixture with the robot tool head aligned to the two beam-projecting lasers using the tool contact point.

Figure 6:
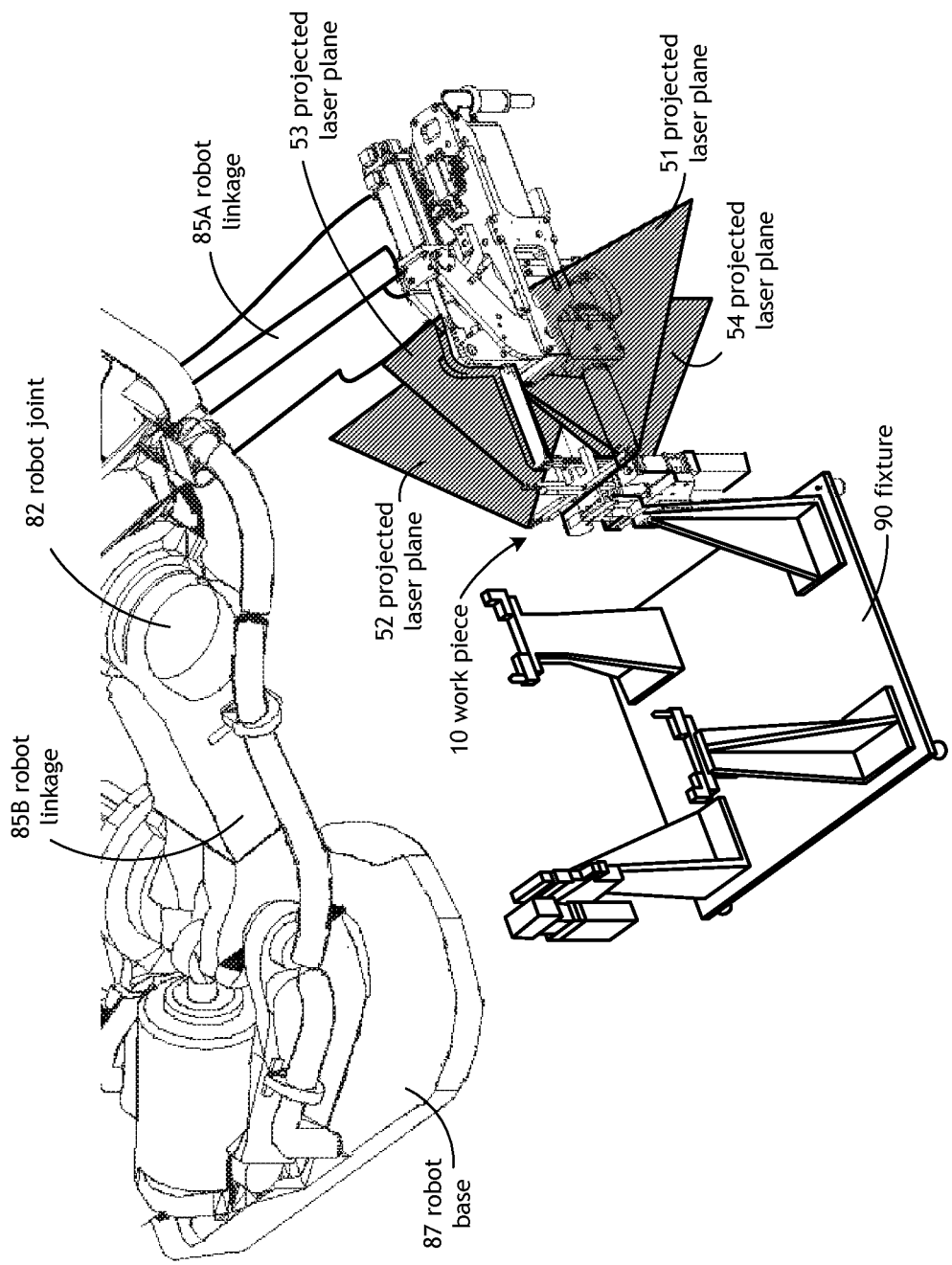
FIG. 6 depicts the assembly view of the first preferred embodiment of the work object of FIG. 5, further depicting the four plane-projecting lasers being used for adjusting the yaw, pitch, and roll of the tool head of the robot.

FIG. 6 further depicts the four projected laser planes [51, 52, 53, and 54] from the plane-projecting lasers of work piece [10], which are used to adjust the yaw, pitch, and roll of the tool head of the robot [80].

Figure 7:
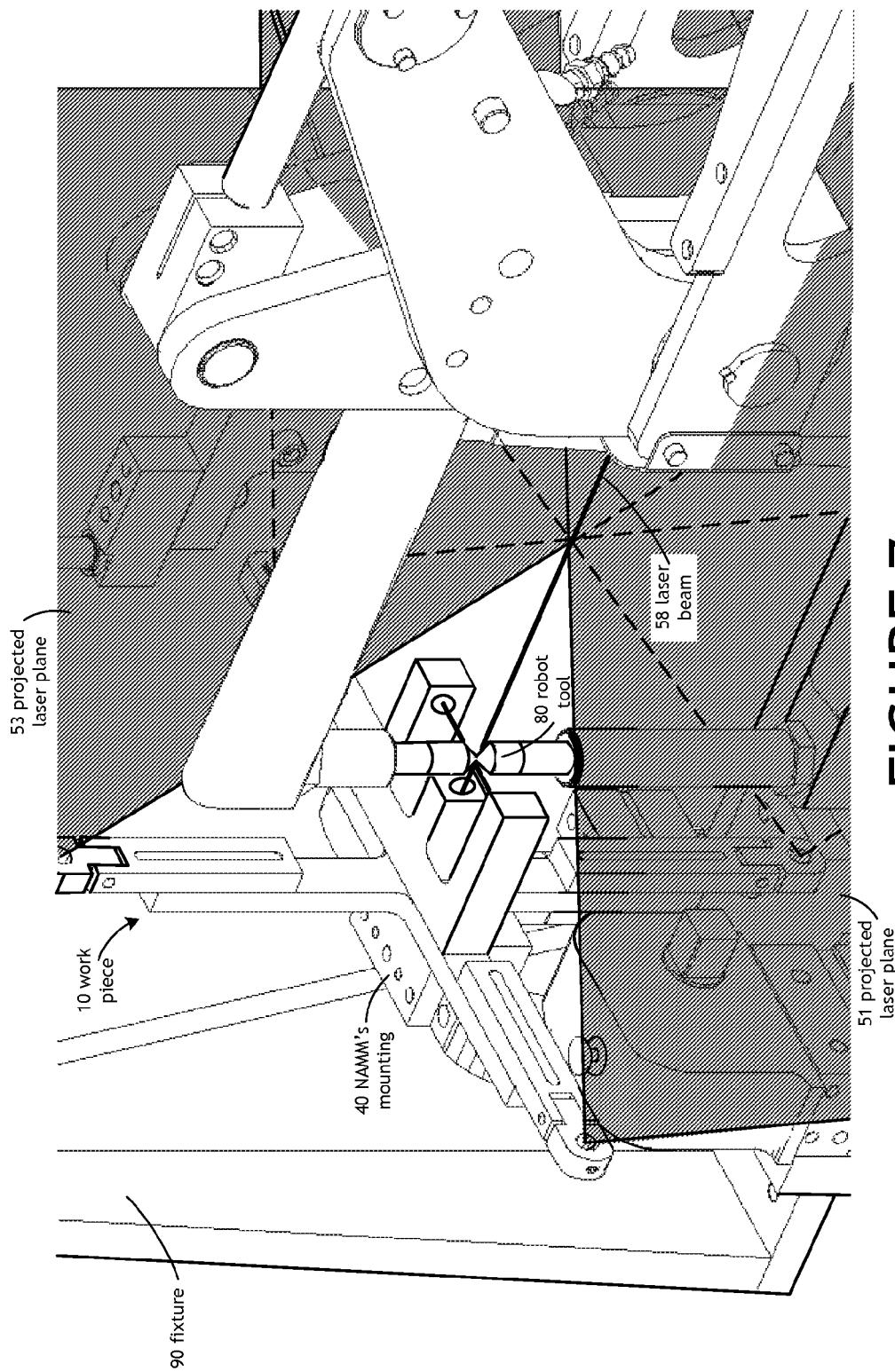
FIG. 7 depicts another exploded view of the first preferred embodiment of the work object of FIG. 6, further depicting the work object being mounted to the fixture with the robot tool aligned to the tool contact point alignment lasers and the yaw, pitch, and roll alignment lasers.

FIG. 7 further depicts the work object [10] being mounted to the fixture [90] with the robot tool [80] aligned to the tool contact point [60] alignment laser beams [56 & 58] setting the X, Y, and Z coordinates.

Figure 8:
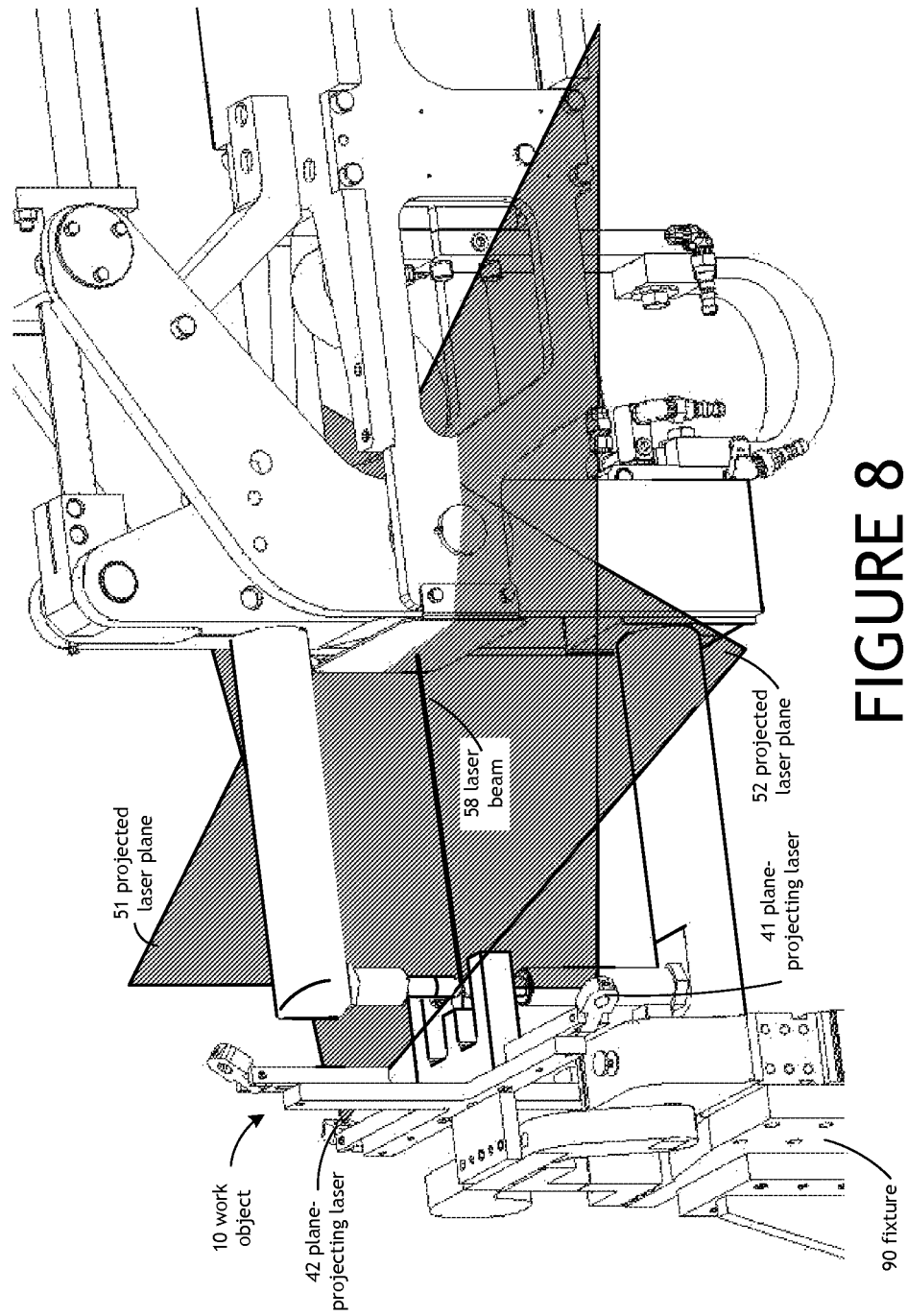
FIG. 8 depicts an assembly view of the second preferred embodiment of the work object of the present invention, two plane-projecting lasers being emitted along the horizontal axis of the work object, a pair of beam-projecting lasers intersecting at a tool contact point, the robot tool being aligned to the tool contact point and to this pair of plane-projecting lasers.

FIG. 8 depicts a second preferred embodiment of the work object [110] of the present invention. In this embodiment, two projected laser planes [51 and 52] are emitted from two plane-projecting lasers [41 and 42] are emitted along the horizontal axis of the frame of the work object [110]. The robot tool [80] is aligned to the tool contact point [60] and to this pair of projected laser planes [51 and 52].

Figure 9:
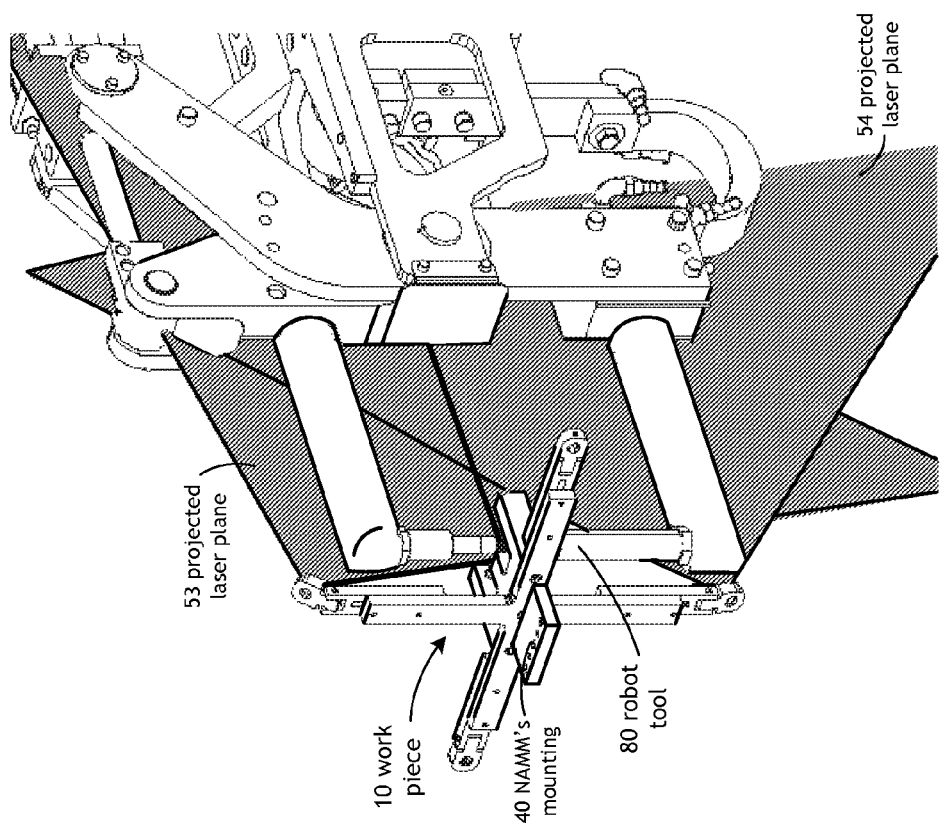
FIG. 9 depicts an assembly view of the third preferred embodiment of the work object of the present invention, two plane-projecting lasers being emitted along the vertical axis of the work object, a pair of beam-projecting lasers intersecting at a tool contact point, the robot tool being aligned to the tool contact point and to this pair of plane-projecting lasers.

FIG. 9 depicts a third preferred embodiment of the work object [210] of the present invention. In this embodiment, two projected laser planes [53 and 54] are emitted from two plane-projecting lasers [43 and 44] are emitted along the vertical axis of the frame of the work object [110]. The robot tool [80] is aligned to the tool contact point [60] and to this pair of projected laser planes [53 and 54].

FIG. 10 depicts yet another preferred embodiment of the work object [310] of the present invention. In this embodiment, two projected laser planes [53 and 54] are emitted from two plane-projecting lasers [43 and 44] along the vertical axis of the work object [10], and a beam-projecting laser [56] intersects one of the vertical plane-projecting lasers [53 and 54] at a tool contact point [60].

Figure 11A:
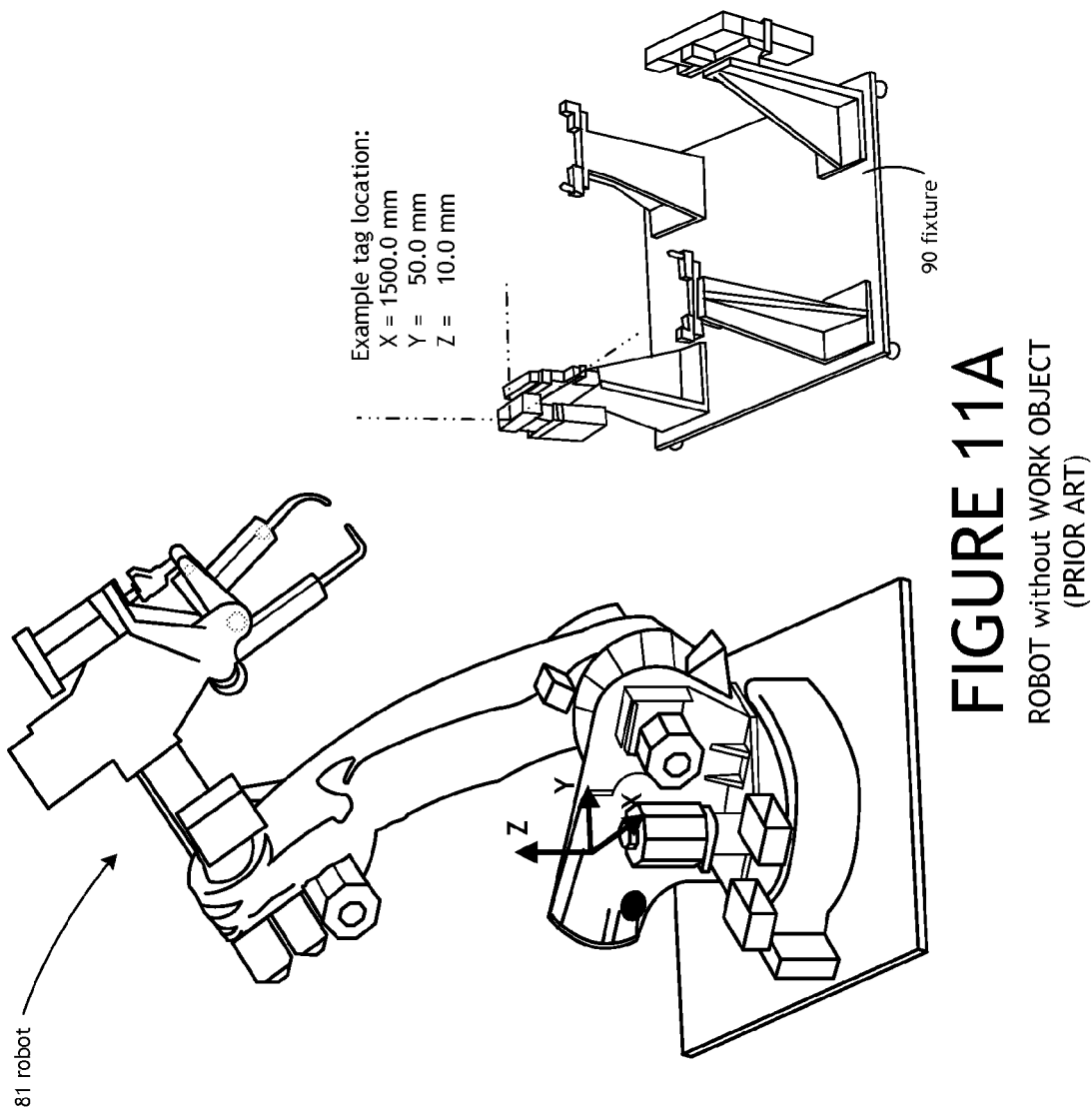
FIG. 11A depicts a robot and a fixture for use on a shop floor in a prior art embodiment without the work object of the present invention.

FIG. 11A depicts a robot and a fixture [90] for use on a shop floor in a prior art embodiment without the work object of the present invention. Without using the work object [10] of the present invention, the locations of the robot tags are relative to the robot base [81]. There is no known distance between the robot "zero" location and the fixture [90]. The tag location is relative to "zero" location on the robot base. An example of the tag location on the fixture 90 is X=1500.0 mm, Y=50.0 mm, and Z=10.0 mm.

Figure 11B:
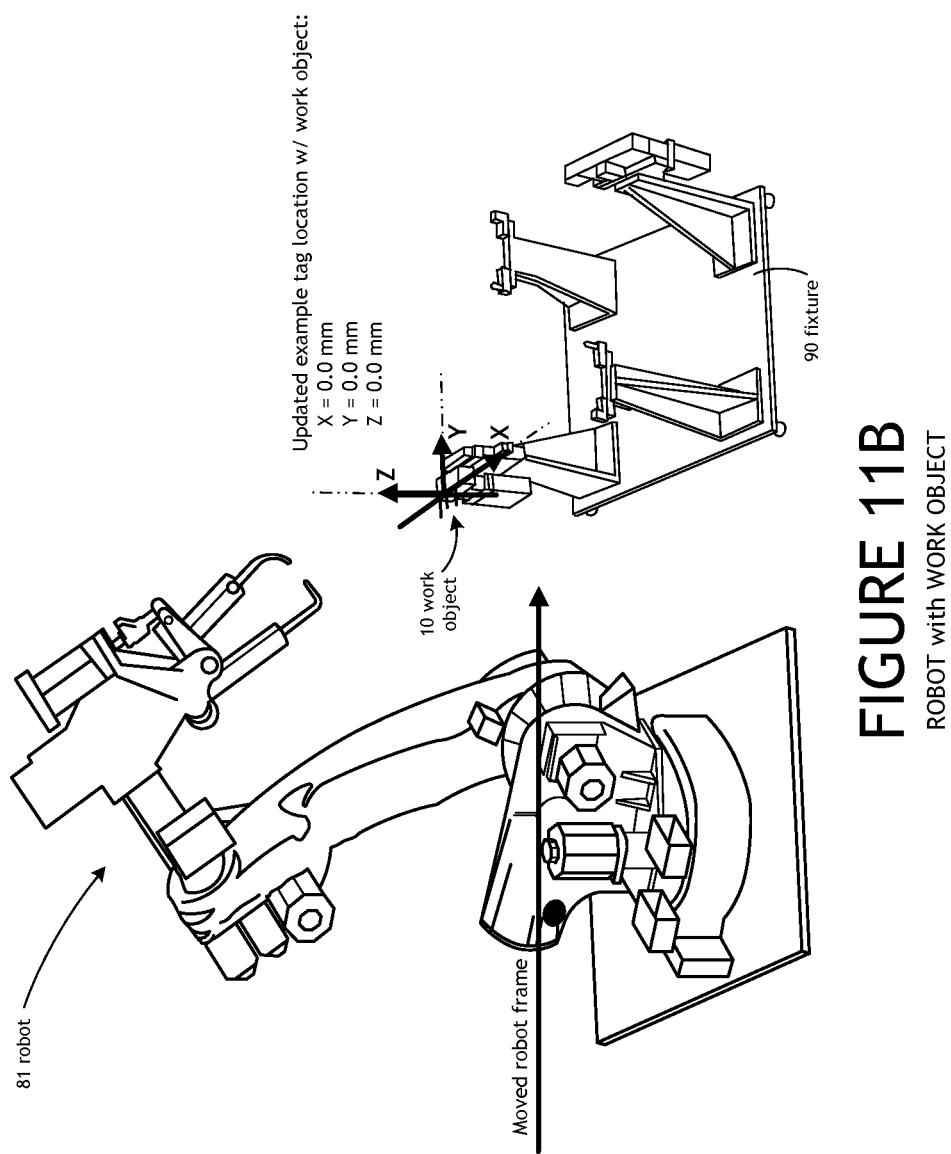
FIGS. 11B and 11C depict a similar robot, fixture with the work object of the present invention, showing how in a simplified manner the work object is used to obtain a new zero location and calibrate the path between the fixture and the robot.

FIG. 11B depicts a robot, and fixture [90] with the work object [10] of the present invention, showing how in a simplified manner the work object [10] is used to obtain a new zero location and calibrate the path between the fixture [90] and the robot. When using the work object [10] of the present invention, the locations of the robot tags are relative to the work object [10] which is now mounted on the fixture [90]. Here, the location of the robot path tags in this example are X=0.0 mm, Y=0.0 mm, and Z=0.0 mm.

Figure 11C:
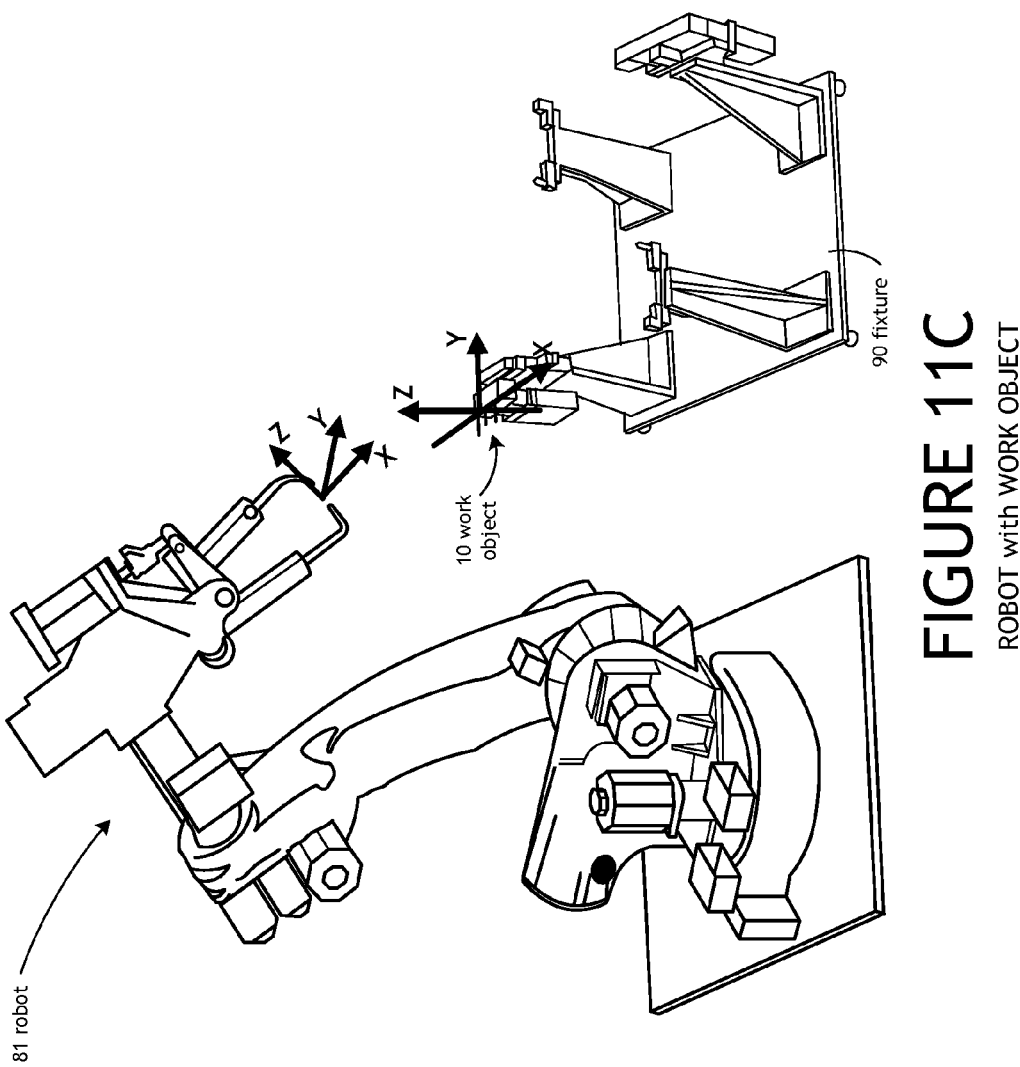

FIG. 11C again depicts the robot, and fixture [90] with the work object [10] of the present invention, showing how in a simplified manner the work object [10] is used to obtain a new zero location and calibrate the path between the fixture [90] and the robot. When the weld gun tips are placed with the work object [10] of the present invention, the robot will obtain the new zero location and calibrate the path to this location between the fixture [90] and the robot.

Using CAD simulation software, the CAD user selects a position on the tool to place the robotic work object calibration system that is best suited to avoid crashes with other tooling and for ease of access for the robot or end-of-arm tooling. The offline programs are then downloaded relative to this work object [10]. This work object [10] will be placed onto the tool or work piece in the position that was defined by the CAD user onto the shop floor. The robot technician will then manipulate the tool contact point (TCP) of the robot tool [80] into the device and align it to the beam-projecting lasers [56 and 58] to obtain the difference between the CAD world and shop floor. This difference will be entered into the robot tool [80] and used to define the new work object [10] thus calibrating the offline programs and defining the distance and orientation of the tool, fixture, and peripheral.

The offline programming with work object of the present invention [10] on the fixture [90] enable the work object [10] to be touched up to the "real world position" of the fixture [90] relative to the robot. If the fixture [90] ever needs to be moved or is accidently bumped, simply touch up the work object of the present invention [10] and the entire path shifts to accommodate.

The robotic work cell calibrations system of the present invention is compatible with any robotic simulation package including but not limited to ROBCAD, Process Simulate, DELMIA, Roboguide and RobotStudio CAD softwares.

The beam-projecting lasers [56 and 58] and the projected laser planes [51, 52, 53, and 54] are projected onto known features of the robot tool [80], and then used to calibrate the path of the robot tool [80] and measure the relationship of the fixture [90] to the robot tool [80].

The work object [10] of the present invention preferably mounts onto a fixture [90] using a standard NAMM's hole pattern mount [40].

The robotic work object cell calibration system of the present invention uses a work object [10] has a zero point, a zero reference frame, and a zero theoretical frame in space, which is positioned on the fixture [90].

The work object [10] is placed onto the fixture [90] which visually represents the work object [10] allowing the tool contact point (TCP) of the weld gun to be orientated into the work object [10] obtaining the "real-world" relationship of the robot tool [80] to the fixture [90] while updating the work object [10] to this "real-world" position.

The robotic work object cell calibration system of the present invention requires the position of the work object [10] correlating with the position of the robot tool [80] to calibrate the path of the robot tool [80] while acquiring the "real-world" distance and orientation of the fixture [90] relative to the robot tool [80].

The robotic work object cell calibration system of the present invention positions the robot tool [80] into the work object [10] and obtains the difference.

The laser plane generating system deployed in the robotic work object cell calibration system of the present invention is well known in the art—see for example U.S. Pat. No. 5,689,330 (Gerard, et al.), entitled "Laser Plane Generator Having Self-Calibrating Levelling System"; and U.S. Pat. No. 6,314,650 (Falb), entitled "Laser System for Generating a Reference Plane".

The robotic work object cell calibration system of the present invention is used to calibrate a "known" work object or frame (robotic simulation CAD software provided work object). The robotic work object cell calibration system of the present invention works by projecting laser beams to a known X, Y, and Z position and defining known geometric planes used to adjust the yaw, pitch, and roll of the robot tool [80] relative to the tool contact point (TCP) [60].

The laser will be projected onto the robotic end of the robot arm tooling (weld guns, material handlers, mig torches, etc) where the user will manipulate the robot with end of are tooling into these lasers to obtain the positional difference between the "known" off-line program (simulation provided work object) and the actual (shop floor) work object calibration. The reverse is also true—for instance; a material handler robot can carry the work object [10] to a know work piece with known features.

The robotic work object cell calibration system of the present invention is used as hereafter described. The CAD model of the work object [10] is placed in the robotic simulation CAD world. The CAD user will select a position best suited on a tool or work piece to avoid crashes with other tooling and for ease of access for the Robot or end-of-arm tooling. The off-line programs are then downloaded relative to this work object [10]. The work object [10] will be placed onto the tool or work piece in the position that was defined by the CAD user onto the shop floor. The robot technician will then manipulate the robot's tool center-point into the device and align it to the laser beams to obtain the difference between the CAD world and shop floor. This difference will be entered into the robot and used to define the new work object thus calibrating the off-line programs and defining the distance and orientation of the tool, fixture, peripheral, and other key components.

The robotic work object cell calibration system of the present invention calibrates the paths to the robot (accurate or inaccurate) while involving the calibration of the peripherals of the robot.

The robotic work object cell calibration system of the present invention aids in the kiting or reverse engineering of robotic systems for future use in conjunction with robotic simulation software allowing integrators the ability to update their simulation CAD files to the "real world" positions.

The technology uses existing body-in-white procedures, personnel computers and software and ways of communicating information amongst the trades.

Throughout this application, various Patents and Applications are referenced by number and inventor. The disclosures of these documents in their entireties are hereby incorporated by reference into this specification in order to more fully describe the state of the art to which this invention pertains.

It is evident that many alternatives, modifications, and variations of the robotic work object and cell calibration system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST 10. work object ($1^{st}$ preferred embodiment)
22. horizontal frame member
24. vertical frame member
25. E-shaped structure
26A and 26B. arms
32A. left frame end (horizontal)
32B. right frame end (horizontal)
32C. upper frame end (vertical)
32D. lower frame end (vertical)
40. NAMM's mounting
41. plane-emitting laser from left-side of horizontal frame
42. plane-emitting laser from right-side of horizontal frame
43. plane-emitting laser from upper vertical frame
44. plane-emitting laser from lower vertical frame
51. projected laser plane from plane-emitting laser (41)
52. projected laser plane from plane-emitting laser (42)
53. projected laser plane from plane-emitting laser (43)
54. projected laser plane from plane-emitting laser (44)
56. laser beam from arm (26A)
58. laser beam from center of "E"
60. tool contact point
80. robot tool
82. robot joint
85A. & 85B. robot linkages
87. robot base
90. fixture
110. work object—$2^{nd}$ preferred embodiment
210. work object—$3^{rd}$ preferred embodiment
310. work object—$4^{th}$ preferred embodiment

I claim:

1. A work object to calibrate a work path of a robot tool, said work object having a frame, said frame, in use, emitting first and second laser beams, said first and second laser beams intersecting at a known point in space, said frame, in use, emitting at least first and second laser planes;
    whereby said frame is mountable onto a fixture and enables said work path to be calibrated relative to said known point in space; and
    whereby said at least first and second laser planes enable adjustment of angular positions of said robot tool relative to said known point in space.

2. The work object of claim 1, wherein said frame emits third and fourth laser planes, said third and fourth laser planes enabling adjustment of the yaw, pitch, and roll of said robot tool.

3. The work object of claim 1, wherein said frame ends are pivotally adjustable.

4. A work object to calibrate a work path of a robot tool, said work object having a frame, said frame, in use, emitting at least a first and a second laser plane, said frame including an arm extending therefrom, a laser beam being emitted from said arm, said laser beam intersecting said first laser plane at a known point in space;
    whereby said work object is mountable onto a fixture and enables said work path to be calibrated relative to said known point in space; and
    whereby at least said first and second laser planes enable adjustment of angular positions of said robot tool relative to said known point in space.

5. The work object of claim 4, further comprising a second laser beam, said second laser beam intersecting said first laser beam at said known point in space.

6. The work object of claim 5, further comprising third and fourth laser planes, said third and fourth laser planes enabling adjustment of the yaw, pitch, and roll of said robot tool.

7. The work object of claim 4, wherein said frame ends are pivotally adjustable.

8. A system for calibrating a robot work path, said system comprising:
    a work object being mountable onto a fixture, said work object having a frame, said frame, in use, emitting first and second laser beams, said first laser beam intersecting said second laser beam at a known point in space, said frame, in use, emitting at least two laser planes, said work object enabling said robot work path to be calibrated relative to said known point in space; and
    a robot tool that is alignable with said work object at said known point in space, a robot work path being calibrated for said robot tool when said work object is mountable onto a fixture, said at least two laser planes enabling adjustment of angular positions of said robot tool relative to said known point in space in at least two planes.

9. The system of claim 8, wherein said frame includes four lasers, each of the lasers emitting a laser plane, said laser planes enabling enabling adjustment of the yaw, pitch, and roll of said robot tool.

10. A system for calibrating a robot work path, said system comprising:
   a work object being mountable onto a fixture, said work object having a frame, said frame, in use, emitting at least a first and a second laser plane, said frame including an arm extending therefrom, a laser beam being emitted from said arm, said laser beam intersecting said first laser plane at a known point in space;
   a robot tool that is alignable with said work object at said known point in space, a robot work path being calibrated for said robot tool when said work object is mountable onto a fixture, said first and second laser planes enabling adjustment of angular positions of said robot tool relative to said known point in space in at least two planes.

11. The work object of claim 10, further comprising a second laser beam, said second laser beam intersecting said first laser beam at said known point in space.

12. The system of claim 11, further comprising a second pair of laser planes, said at least a first pair and said second pair of laser planes enabling adjustment of the yaw, pitch, and roll of said robot tool.

13. A work object to calibrate a work path of a robot tool, said work object having a frame, said frame, in use, emitting first and second laser beams, said first and second laser beams intersecting at a known point in space, said frame, in use, emitting a first, second, third, and fourth laser planes;
   whereby said frame is mountable onto a fixture and enables said robot work path to be calibrated relative to said known point in space; and
   whereby said first, second, third, and fourth laser planes enable adjustment of angular positions of said robot tool relative to said known point in space.

14. The work object of claim 13, wherein said frame enables adjustment of yaw, pitch, and roll of said robot tool.

15. The work object of claim 13, wherein said frame ends are pivotally adjustable.

\* \* \* \* \*